US010788368B1

(12) United States Patent
Pelc et al.

(10) Patent No.: US 10,788,368 B1
(45) Date of Patent: Sep. 29, 2020

(54) THERMAL ISOLATION STRUCTURE

(71) Applicant: Apple Inc., Cupertino, CA (US)

(72) Inventors: Jason Pelc, Sunnyvale, CA (US); Mark Alan Arbore, Los Altos, CA (US)

(73) Assignee: Apple Inc., Cupertino, CA (US)

(*) Notice: Subject to any disclaimer, the term of this patent is extended or adjusted under 35 U.S.C. 154(b) by 22 days.

(21) Appl. No.: 16/144,960

(22) Filed: Sep. 27, 2018

Related U.S. Application Data

(60) Provisional application No. 62/565,837, filed on Sep. 29, 2017.

(51) Int. Cl.
G01J 3/02 (2006.01)
G01J 3/10 (2006.01)

(52) U.S. Cl.
CPC .............. G01J 3/0286 (2013.01); G01J 3/10 (2013.01)

(58) Field of Classification Search
CPC ................................. G01J 3/0286; G01J 3/10
See application file for complete search history.

(56) References Cited

U.S. PATENT DOCUMENTS

| 5,483,261 | A  | 1/1996  | Yasutake        |
| 5,488,204 | A  | 1/1996  | Mead et al.     |
| 5,825,352 | A  | 10/1998 | Bisset et al.   |
| 5,835,079 | A  | 11/1998 | Shieh           |
| 5,880,411 | A  | 3/1999  | Gillespie et al.|
| 6,188,391 | B1 | 2/2001  | Seely et al.    |
| 6,310,610 | B1 | 10/2001 | Beaton et al.   |
| 6,323,846 | B1 | 11/2001 | Westerman et al.|
| 6,690,387 | B2 | 2/2004  | Zimmerman et al.|
| 7,015,894 | B2 | 3/2006  | Morohoshi       |
| 7,184,064 | B2 | 2/2007  | Zimmerman et al.|

(Continued)

FOREIGN PATENT DOCUMENTS

| JP | 2000-163031 A | 6/2000  |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Isiaka O Akanbi
*Assistant Examiner* — Nathaniel J Lee
(74) *Attorney, Agent, or Firm* — Brownstein Hyatt Farber Schreck, LLP

(57) ABSTRACT

Disclosed here is a system including a multi-wavelength integrated light source having one or more heaters. The system can comprise a substrate including a light source section, the heater(s), and a plurality of sections. The sections can include multiple materials, where the material for a given section can be based on one or more targeted criteria. For example, one section can have a targeted criteria of being optically transparent. Another section can have a targeted criteria of providing mechanical support, and another section can have a targeted criteria of being a thermal insulator. In some instances, openings in the substrate can be formed and filled with one or more materials to form a window (e.g., a section having a targeted criteria of being optically transparent) and a thermal isolator (e.g., a section having a targeted criteria of being thermally insulating).

19 Claims, 7 Drawing Sheets

(56) References Cited

U.S. PATENT DOCUMENTS

| | | | |
|---|---|---|---|
| 7,663,607 B2 | 2/2010 | Hotelling et al. | |
| 7,664,156 B2 | 2/2010 | Yamazaki | |
| 7,751,658 B2 | 7/2010 | Welch et al. | |
| 8,320,763 B2 | 11/2012 | Kim et al. | |
| 8,479,122 B2 | 7/2013 | Hotelling et al. | |
| 9,172,211 B2 | 10/2015 | Kuksenkov et al. | |
| 2005/0030540 A1* | 2/2005 | Thornton | G01J 3/4338 356/432 |
| 2006/0197753 A1 | 9/2006 | Hotelling | |
| 2013/0089114 A1* | 4/2013 | Pushkarsky | H01S 5/3402 372/34 |
| 2015/0125111 A1* | 5/2015 | Orcutt | G02B 6/136 385/14 |
| 2017/0195062 A1 | 7/2017 | Evans et al. | |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

THERMAL ISOLATION STRUCTURE

CROSS-REFERENCE TO RELATED APPLICATIONS

This application claims benefit of U.S. Provisional Patent Application No. 62/565,837, filed Sep. 29, 2017, the entire disclosure of which is incorporated herein by reference for all purposes.

FIELD OF THE DISCLOSURE

This relates to a thermal isolation structure and methods for forming thereof. More specifically, this relates to a thermal isolation structure in a multi-wavelength integrated light source including one or more heaters.

BACKGROUND OF THE DISCLOSURE

Optical spectroscopy can be an analytical technique. Conventional systems and methods for optical spectroscopy can include emitting light. A portion of the emitted light energy can be absorbed at one or more wavelengths. This absorption can cause a change in the properties of the light.

Many different types of light sources may be suitable for optical spectroscopy. One type of light source can include semiconductor lasers, which may have suitable characteristics for a given application. For example, lasers can have single frequency emissions with narrow linewidths and can be capable of tuning to a certain target emission wavelength(s). The precision and accuracy of the emission wavelengths of the light source can be important for achieving quantitatively accurate spectroscopic measurements for some applications. In some instances, optical spectroscopy may benefit from multi-wavelengths measurements. Additionally or alternatively, optical spectroscopy can be suitable for use in portable electronic devices, which may benefit from reduced power consumption. Light sources that can emit multiple wavelengths of light, can be tuned to within a certain amount of precision, and with reduced power consumption can be desired.

SUMMARY OF THE DISCLOSURE

Disclosed herein is a system including a multi-wavelength integrated light source having one or more heaters. The system can comprise a substrate including a light source section and a heater. In some examples, the substrate can include one or more optical components such as an outcoupler. Additionally, the substrate can include a plurality of sections. The plurality of sections can include multiple materials, where the selected material for each section can be based on one or more targeted criteria. For example, one section can have a targeted criterion of being optically transparent in at least a wavelength range (e.g., visible wavelengths). Another section can have a targeted criterion of providing mechanical support, and another section can have a targeted criterion of being a thermal insulator. In some instances, a window (e.g., a section having a targeted criterion of being optically transparent) and a thermal isolator (e.g., a section having a targeted criterion of being a thermal insulator) can be formed in a support. The support can be a substrate that is single and continuous before a window and a thermal isolator are formed. Openings in the substrate can be formed and filled with one or more materials, which can form the window and the thermal isolator.

DETAILED DESCRIPTION

Figure 1:
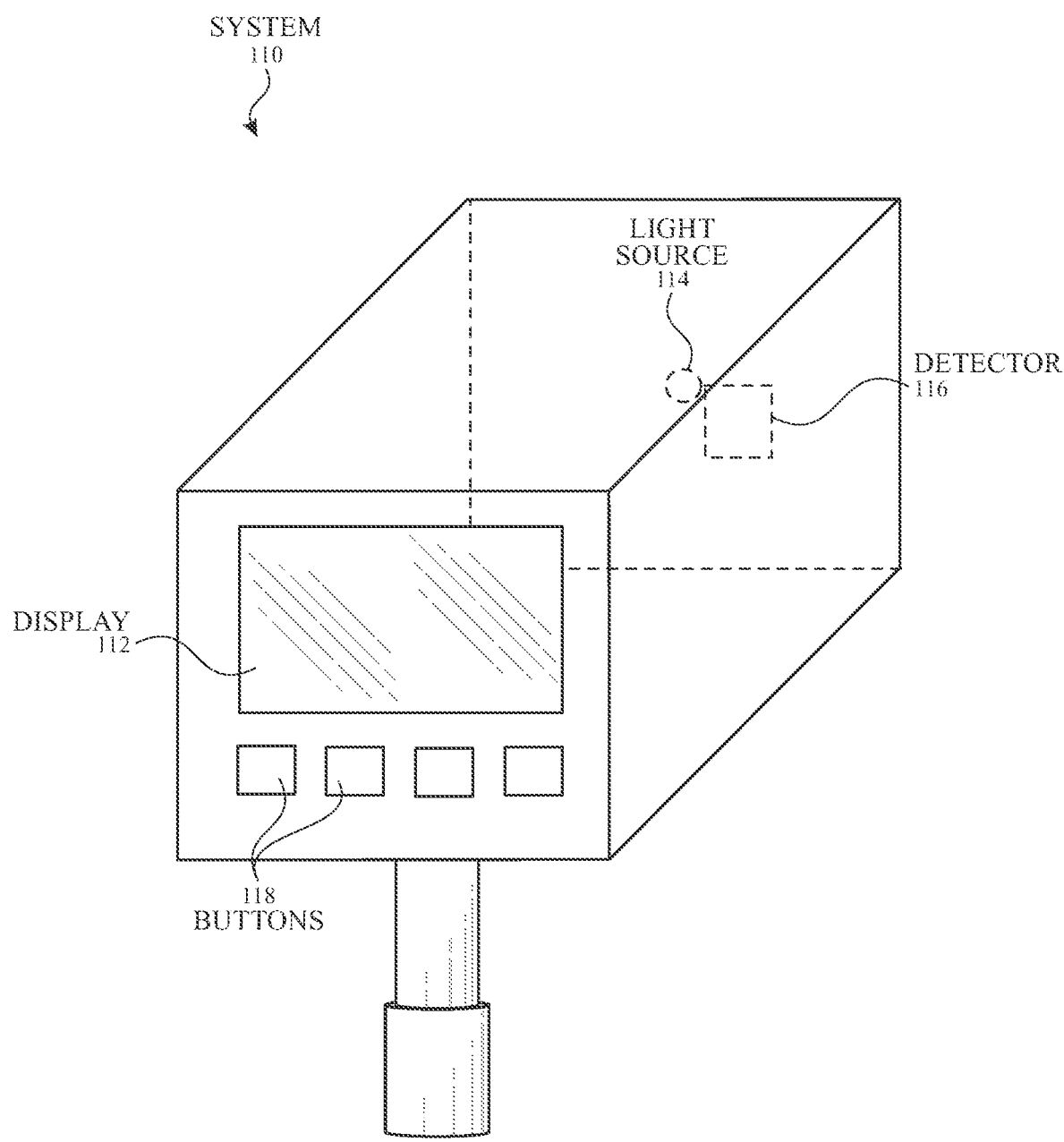
FIG. 1 illustrates an exemplary system in which examples of the disclosure can be implemented.

In the following description of examples, reference is made to the accompanying drawings in which it is shown by way of illustration specific examples that can be practiced. It is to be understood that other examples can be used and structural changes can be made without departing from the scope of the various examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

Disclosed herein is a system including a multi-wavelength integrated light source having one or more heaters. The system can comprise a substrate including a light source section and a heater. In some examples, the substrate can include one or more optical components such as an outcoupler. Additionally, the substrate can include a plurality of sections. The plurality of sections can include multiple materials, where the selected material for each section can be based on one or more targeted criteria. For example, one section can have a targeted criterion of being optically transparent in at least a wavelength range (e.g., visible wavelengths). Another section can have a targeted criterion of providing mechanical support, and another section can have a targeted criterion of being a thermal insulator. In some instances, a window (e.g., a section having a targeted criterion of being optically transparent) and a thermal isolator (e.g., a section having a targeted criterion of being a thermal insulator) can be formed in a support. The support can be a substrate that is single and continuous before the window and the thermal isolator are formed. Openings in the substrate can be formed and filled with one or more materials, which can form the window and the thermal isolator.

Representative applications of methods and apparatuses according to the present disclosure are described in this section. These examples are provided solely to add context and aid in the understanding of the described examples. It will be apparent to one skilled in the art that the described examples may be practiced without some or all of the specific details. Other applications are possible, such that the following examples should not be taken as limiting.

FIG. 1 illustrates an exemplary system in which examples of the disclosure can be implemented. System 110 can include a display 112, a light source 114, a detector 116, and buttons 118. The light source 114 can be configured to emit multiple wavelengths of light. In some examples, the light source 114 can include one or more tunable semiconductor lasers. Tunable light sources can have many applications (e.g., trace gas detection, environmental monitoring, biomedical diagnostics, telecommunications, and industrial process controls) in portable electronic devices. Some applications can benefit from light sources with high precision tunability, narrow or extremely narrow linewidths, single frequency emission, and multi-wavelengths emissions. Additionally, some applications can benefit from portable electronic devices including multi-wavelengths tunable light sources with reduced power consumption. One way to reduce the power requirements for operating the light source 114 can be to use thermal isolation structures, as will be described below.

The precision and accuracy of the emission wavelengths of the light source can be important for achieving quantitatively accurate spectroscopic measurements for some applications. Precise and accurate tuning of the light source can be associated with high power consumption. Higher power consumption can be due to changes in temperature of the light source, increased injection currents, thermal crosstalk in a system comprising a plurality of light sources, and the like. For example, the wavelength of light emitted by a light source (e.g., a laser) can depend on the temperature of the light source, where a change in temperature can cause a shift in wavelength (i.e., a deviation from the target wavelength). For example, light emitted by a light source can shift 0.1-1 nm/K depending on the materials used and the design of the light source. The shift in wavelength can be reduced by controlling (e.g., stabilizing) the temperature of the light source.

In some examples, light sources can have efficiencies less than unity (i.e., 100%). For example, some light sources can have efficiencies between 5-50%. The efficiencies can be increased by driving higher injection currents. In some instances, driving the light source with higher injection currents can generate significant waste heat and/or require more power consumption. The waste heat can cause a shift in the emissions wavelength, where compensating for the shift can increase the power requirements more.

The power requirements can be multiplied in optical spectroscopy, for example, used for certain applications. In some applications, a plurality (e.g., 10-20, 50-100, etc.) of distinct wavelengths of emitted light may be suitable. In some spectroscopic applications (e.g., applications where narrow spectroscopic absorption features can be measured or highly precise quantifications can be made), highly accurate wavelengths can be beneficial. In some examples, highly accurate wavelengths can include no more than a 0.01 nm deviation from the target wavelength. In some examples, highly accurate wavelengths can include no more than a 0.005 nm deviation from the target wavelength. An exemplary application where highly accurate wavelengths may be desirable can include spectroscopic measurements of gases.

For spectroscopy systems including a plurality of light sources configured to emit a plurality (e.g., 50-100) of distinct wavelengths, each light source can experience transient effects. Additionally, the plurality of the light sources can be arranged in close proximity to one another (e.g., in portable electronic devices), which can cause the light sources to be susceptible to thermal crosstalk. In some instances, the system may compensate the transient effects and thermal crosstalk, but at the cost of more power.

Figure 2:
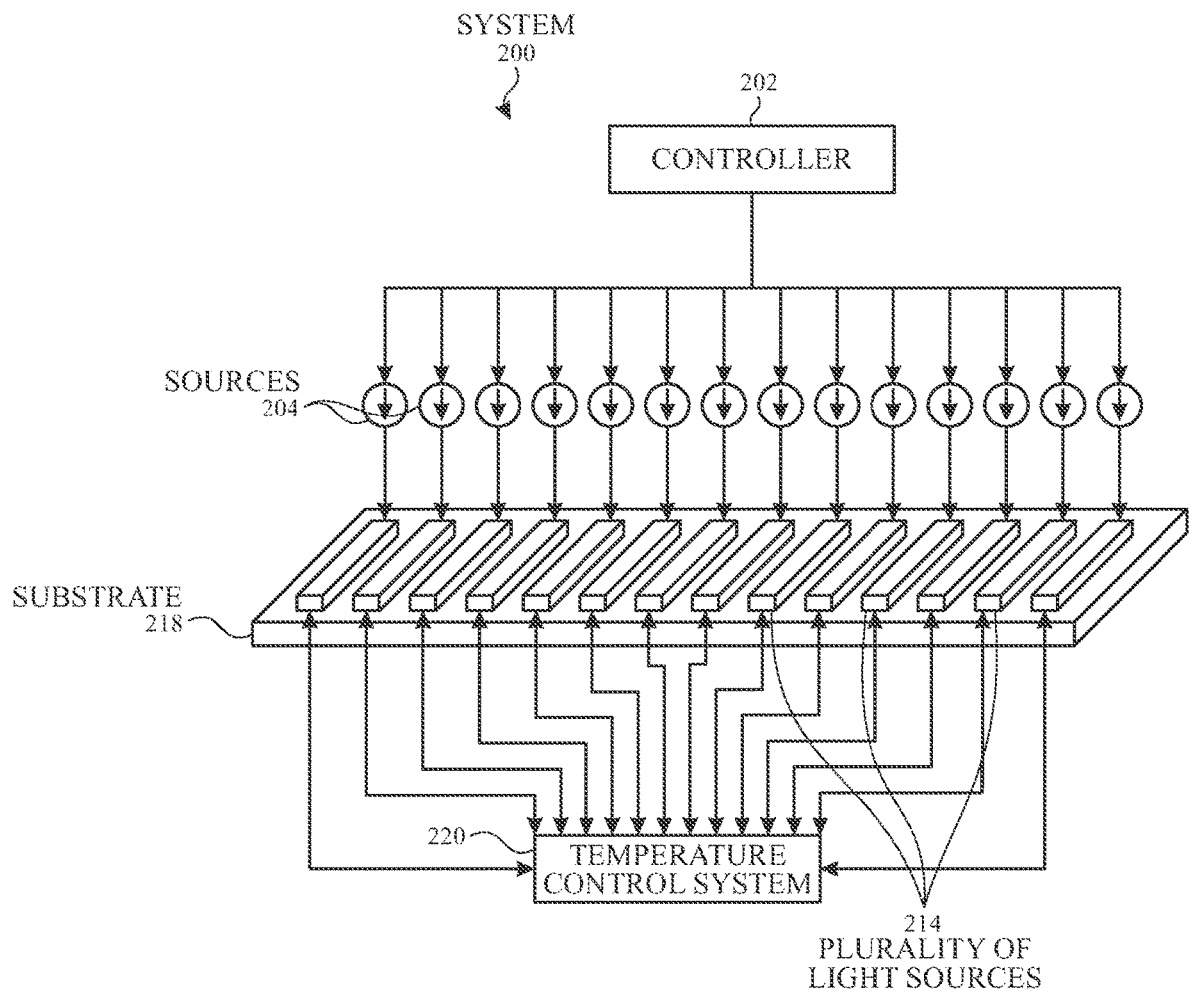
FIG. 2 illustrates an exemplary arrangement of a plurality of light sources included in a system according to examples of the disclosure.

FIG. 2 illustrates an exemplary arrangement of a plurality of light sources included in a system according to examples of the disclosure. The system 200 can include a plurality (e.g., at least 3-10) of light sources 214 formed on the substrate 218 (e.g., a die, chip, or wafer). For example, the plurality of light sources 214 can be grown on the same epitaxial wafer and delineated using lithography. In some examples, the integration can be based on silicon waveguides (e.g., silicon photonics) and/or indium phosphide (InP) waveguides. For example, the plurality of light sources 214 can include one or more lasers whose reflective section(s) (e.g., grating section(s)), gain section, and/or heater(s) can be included on the same substrate 218. Alternatively, the reflective section(s) of a given laser can be included on one type of substrate (e.g., a silicon substrate), while its gain section and heater(s) can be included on another type of substrate (e.g., a III-V substrate).

The term "device" as used throughout can refer to a single standalone component that can operate alone for a given function, or can refer to a system including multiple components that operate together to achieve the same functions. As used throughout this specification, a system, such as an optical sensing system, can include a device.

In some examples, the light sources 214 can be located in close proximity to one another. For example, the separation distance(s) between adjacent light sources can be 10-100 µm. The plurality of light sources 214 can be integrated using, for example, wafer-bonding, evanescent coupling, grating coupling, butt-coupling (e.g., near-field facet coupling), epitaxial growth, or any other suitable means. Once formed and integrated, the outputs of the plurality of light sources 214 can be combined. In some instances, one or more of the plurality of light sources 214 can be configured to emit light at a different wavelength range than other light sources 214. In this manner, combining the outputs of the plurality of light sources 214 can allow the system the capability of tuning along a wide range of wavelengths.

The plurality of light sources 214 can be coupled to the sources 204, which can be coupled to the controller 202. The controller 202 can send one or more signals to one or more (e.g., each) sources 204, where the signals can be indicative of a drive current (or voltage) applied to one or more of the plurality of light sources 214. The plurality of light sources 214 can be coupled to a temperature control system 220. In some examples, the temperature control system 220 can be a closed-loop temperature control system configured to measure the temperature of the plurality of light sources 214. The controller 202 and/or the temperature control system 220 can also be configured to compare the measured temperature(s) (using one or more detectors, not shown) to the target temperature(s). Additionally, the temperature control system 220 can control the temperature(s) of the light sources 214 when a certain amount of difference between the measured and target temperatures exists. The temperature control system 220 can include a plurality of temperature sensors. In some examples, each light source 214 can be coupled to a separate temperature sensor(s). In some examples, the controller 202 can be in communication with the temperature control system 220. In some examples, the controller 202 can include the temperature control system 220.

Figure 3A:
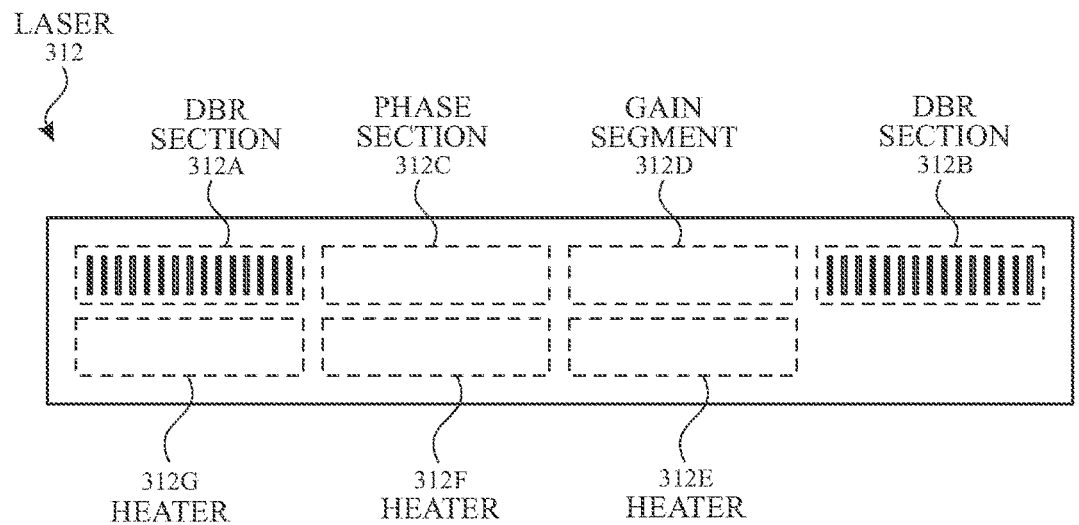
FIG. 3A illustrates a top view of an exemplary light source including one or more integrated heaters according to examples of the disclosure.

Examples of the disclosure can be applied to any type of light source. One exemplary type of light source can include, but is not limited to, a laser, such as the one illustrated in FIG. 3A. Laser 312 can be configured as a Distributed Bragg Reflector (DBR) laser, which can include DBR section 312A, phase section 312C, gain region or gain segment 312D, and DBR section 312B. DBR section 312A and DBR section 312B can include one or more diffraction gratings located on or above the active region (not shown). The diffraction gratings can be configured to provide optical feedback to at least partially reflect light back into the laser cavity to form a resonator. In some examples, the diffraction gratings can be configured to reflect only narrow bands of wavelength(s) to produce a single longitudinal mode wavelength. The period of the gratings can be adjusted to achieve specific emission wavelengths. The DBR section 312A can be configured to have partial transmission and can be configured as an outcoupler, while the DBR section 312B can be configured for total reflection. Although FIG. 3A illustrates a laser including DBR sections, examples of the disclosure can include reflective sections (e.g., a metal mirror at the rear facet of the laser 312). Additionally, examples of the disclosure can be applied to other types of lasers.

The phase section 312C can be configured for tuning by aligning the cavity mode (i.e., lasing wavelength) to the peaks of the DBR reflectivity spectra. In some examples, the phase section 312C can be omitted from the laser 312. The gain segment 312D can be configured to amplify light energy.

Heat from any of the sections (e.g., DBR section 312A, phase section 312C, gain segment 312D, and DBR section 312B) of the laser 312 can spread to any of the other sections. In some examples, one or more of the DBR and phase sections can be coupled to a temperature sensor included in a temperature control system (e.g., the temperature control system 220 illustrated in FIG. 2). While the DBR and phase sections may be temperature controlled (e.g., nominally held at a nearly constant temperature), the gain segment 312D can be affected by changes in generated heat (e.g., from the laser being driven by a current source). For example, the source (e.g., the source 204 illustrated in FIG. 2) can reduce the drive current of the gain segment 312D. The lower drive current can lead to a reduced heat load in the gain segment 312D, which can lead to a drop in the temperature of the gain segment 312D and decreased power requirement. The temperature drop in the gain segment 312D can cause an increase in heat flow between the gain segment 312D and one or more of the DBR section 312A, the DBR section 312B, and the phase section 312C. Alternatively, the temperature drop in gain segment 312D can lead to a decrease in heat flow in the opposite direction.

The temperature control system (e.g., temperature control system 220 illustrated in FIG. 2) can detect the change in temperature within a given laser (e.g., laser 312) and can try to correct for the change in heat flow by increasing the amount of applied heat to one or more segments (e.g., the gain segment 312D) of the laser via any one of the heaters. The laser 312 can include one or more heaters such as heater 312E (located proximate to the gain segment 312D), heater 312F (located proximate to the phase section 312C), and heater 312G (located proximate to the DBR section 312A). In some examples, the heaters can be any type of element capable of generating heat, including but not limited to a resistor (e.g., patterned metal or lightly-doped, ohmic semiconductor material). As discussed above, the heaters can be used to tune the emissions wavelengths of the light source, which may increase the power consumption requirement of the light source.

Figure 3B:
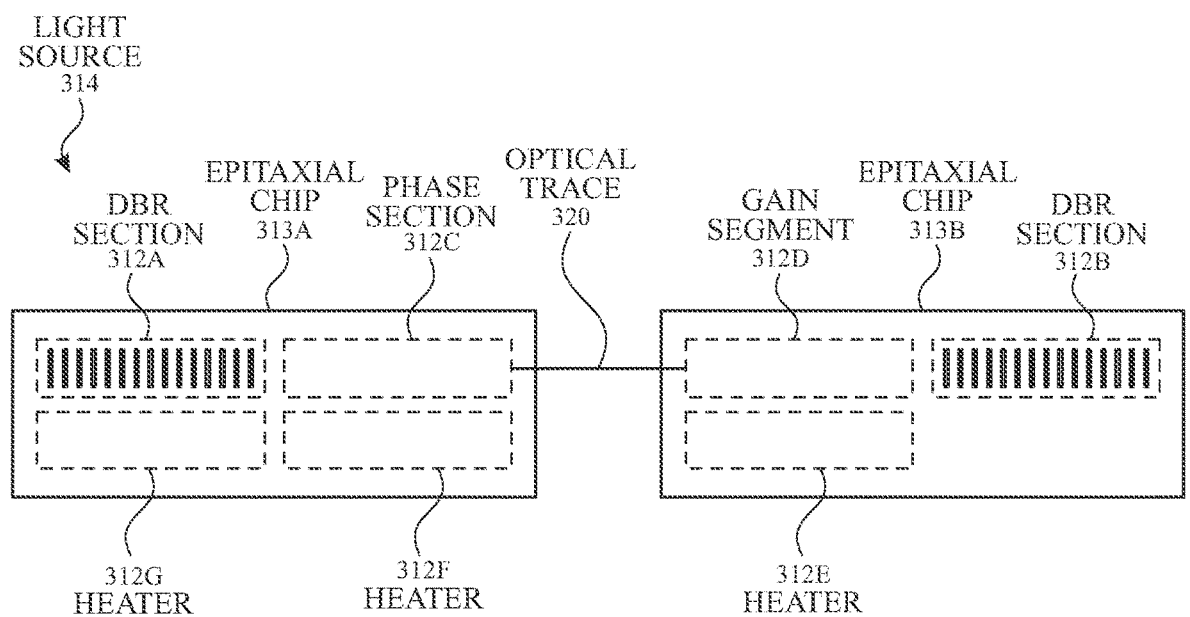
FIG. 3B illustrates a top view of an exemplary light source including sections located on different epitaxial chips according to examples of the disclosure.

Although the figure illustrates a laser and sections within a certain type of laser, examples of the disclosure are not limited to a laser or the type of laser illustrated. Additionally, examples of the disclosure are not limited to a laser having the illustrated sections formed on the same epitaxial wafer. For example, FIG. 3B illustrates a top view of an exemplary light source including multiple epitaxial chips, where some sections (e.g., the DBR section 312A, the phase section 312C, the heater 312F, and the heater 312G) of the light source can be included in the epitaxial chip 313A. Other sections (e.g., the DBR section 312B, the gain segment 312D, and the heater 313E) can be included in the epitaxial chip 313B. Epitaxial chip 313A and epitaxial chip 313B can be optically coupled together via optical trace 320. The terms "optical coupling" and "optically coupled" can include a connection (e.g., an optical path) between two or more components for transferring an optical signal between the components, and optical decoupling refers to the lack of such connection.

In addition to the thermal impacts from sections within a given light source, a light source (e.g., when configured in the arrangement illustrated in FIG. 2) can experience thermal crosstalk, where the modulation of at least one light source (e.g., light source 214 illustrated in FIG. 2) can thermally affect a nearby (e.g., adjacent) light source. In some instances, the effects from such thermal crosstalk can lead to higher power consumption to correct for the thermal crosstalk.

Higher power consumption may also be required to correct for the injection current to the light source. The injection current may be the current input to the light source to operate the laser. For example, as the injection current to the light sources decreases, the temperature of a segment (e.g., gain segment 312D) can decrease, and the system can increase the current to a thermally coupled heater (e.g., heater 312E) in order to maintain the temperature of the light source. Increasing the current to the heater 312E may lead to higher power consumption.

The total power consumption for operating the light source can be due to multiple sub-operations. The sub-operations can include operating the heaters, which may consume power. The power requirements can also be based on the amount of injection current to achieve a targeted power density. One sub-operation that can consume a large percentage of the total power consumption can be tuning the laser. For example, tuning the laser can consume over 50% of the total power consumption for operating the laser. A lower power requirement for tuning the laser may be desired.

Figure 4:
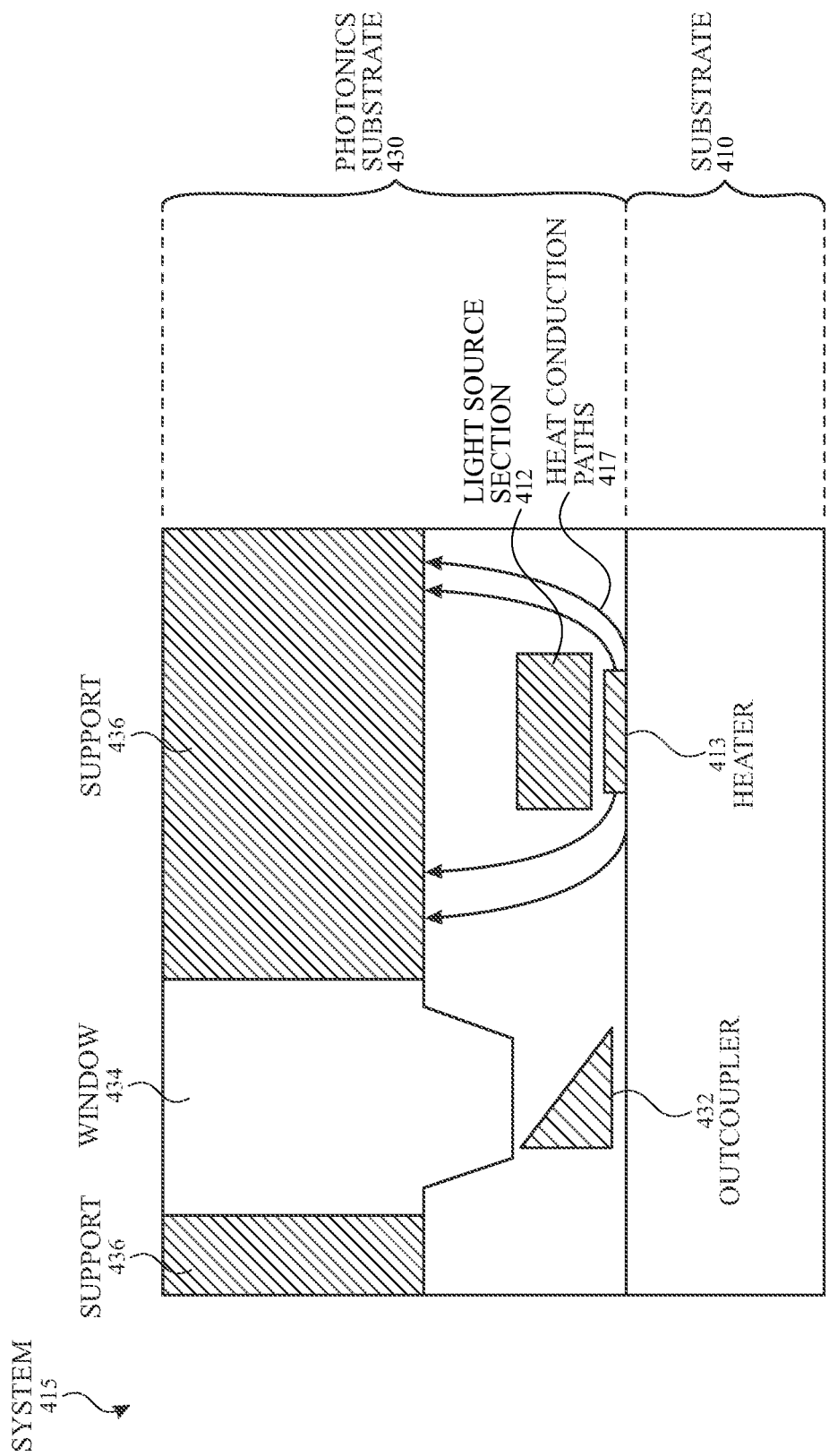
FIG. 4 illustrates a cross-sectional view of an integrated light source system without thermal isolation according to examples of the disclosure.

One way to lower the power requirement can be to change the components used for heating. Another way to lower the power requirement can be to improve the thermal isolation of the heater such that the heating efficiency can be enhanced. FIG. 4 illustrates a cross-sectional view of an integrated light source system without thermal isolation according to examples of the disclosure. The system 415 can include a substrate 410 and a photonics substrate 430.

In some examples, the substrate 410 can be an interposer. The substrate 410 can include one or more electrical traces configured to route signals for one or more components (e.g., routing signals from the heaters to the temperature control system 220 illustrated in FIG. 2). The substrate 410 can be bonded to a photonics substrate 430, for example. The photonics substrate 430 can include one or more components included in the light source, such as a light source section 412 and a heater 413. The photonics substrate 430 can also include one or more optical components such as an outcoupler 432. Additionally, the photonics substrate can include a support 436. At least a portion of the window 434 can be formed within the support 436.

Although the figure illustrates the photonics substrate as including a light source section, a heater, an outcoupler, a window, and a support, examples of the disclosure can further include other optical components such as mirrors, feedback detectors, etc. Additionally or alternatively, examples of the disclosure can include a light source system that may not include one or more of the components shown in the figure.

The photonics substrate 430 may additionally include optical components, electrical components, or both. Exemplary components can include layers used to form one or more waveguides for propagating light, cladding layers for confining light, routing layers including metal traces and optical traces, insulating layer for insulating the metal traces, passivation layers, encapsulation layers, planarizing layers, supporting layers, and the like.

Heat conduction paths 417 can form from the heater 413 to the support 436, as illustrated in the figure. Although the figure uses curved lines to represent the heat conduction paths 417, such lines merely illustrate a schematic representation of one possible path to which heat can travel. One skilled in the art would understand that heat may not be constrained to following the path shown in the curved lines and may travel in, e.g., a different direction, along a longer path, along a path with a different shape, etc.

In some examples, after the photonic substrate 430 is bonded to the substrate 410, the support 436 may be thinned down. A thinner photonics substrate 430 can lead to an increase in the heat efficiency of the heat conduction paths 417. The heat can dissipate out to a location on top (e.g., on a side of the photonics substrate 430 that is opposite from the substrate 410) of the photonics substrate 430 (e.g., out to the environment and/or to an external housing of the device), which can reduce the heat efficiency (i.e., change in temperature per power) of the heater 413. In some examples, the support 436 may include a material that has a high thermal conductivity (e.g., 150 W/mK) and/or may not be thinned down. For example, the support 436 can include crystalline silicon. With reduced heat efficiency, the operation of the heater 413 may lead to higher power consumption.

A window 434 can be formed in the support 436. In some examples, the window 434 can be formed before the photonics substrate 430 is bonded to the substrate 410. The window 434 can include one or more materials (e.g., amorphous silicon). Light emitted from the light source section 412 (e.g., a waveguide) can be directed towards the outcoupler 432 (not shown), the outcoupler 432 can redirect the light to exit the system 415 through the window 434 (not shown). The material(s) for the window 434 can be chosen based on its optical performance (e.g., high transparency in the visible wavelength range).

Figure 5:
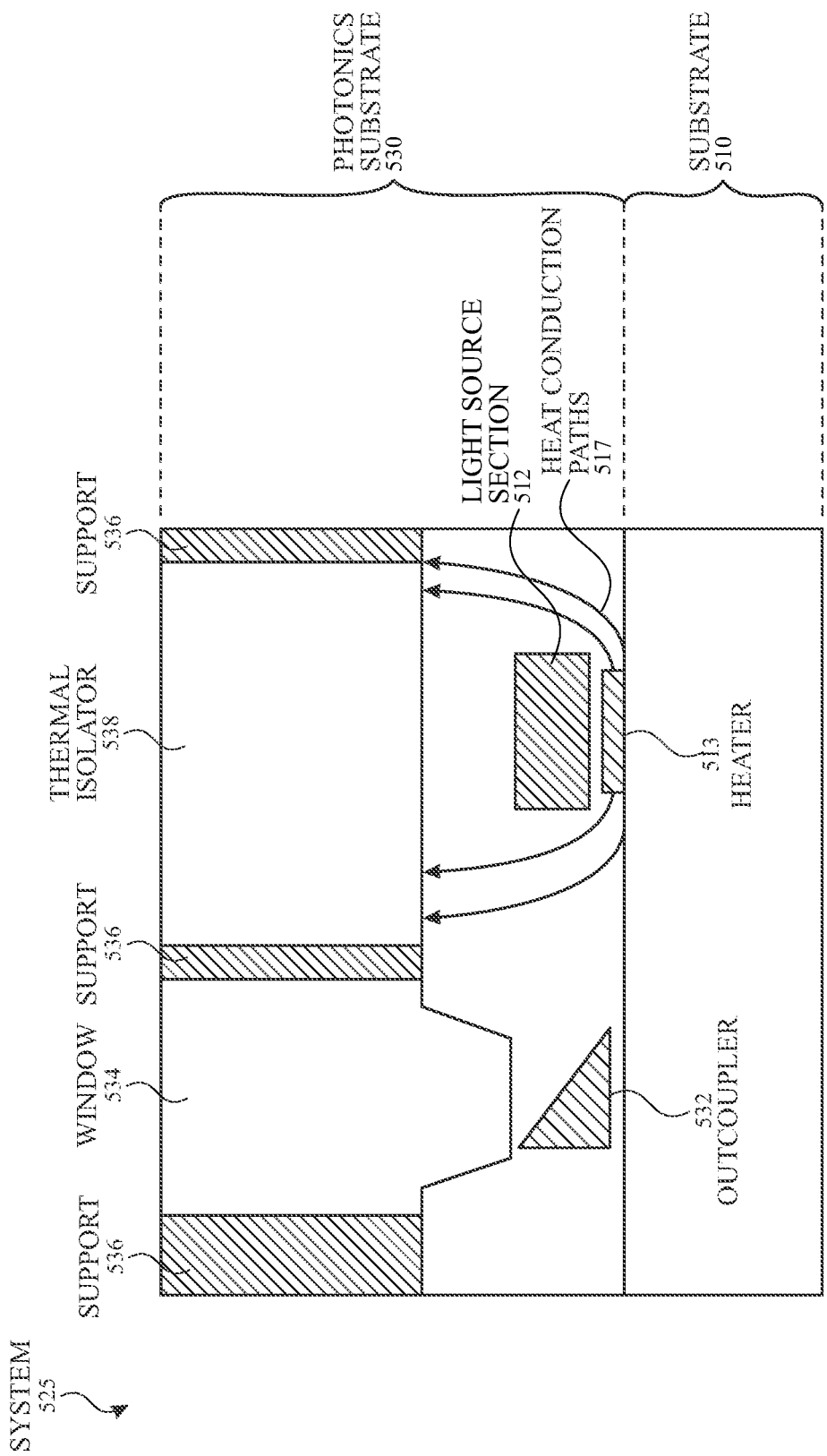
FIG. 5 illustrates a cross-sectional view of an integrated light source system with thermal isolation according to examples of the disclosure.

In some examples, the material(s) for the window (e.g., window 434 illustrated in FIG. 4) can be a material that has both optically transparency (e.g., in the visible wavelength range) and a low thermal conductivity. FIG. 5 illustrates a cross-sectional view of an integrated light source system with thermal isolation according to examples of the disclosure. The system 525 can include a substrate 510 and a photonics substrate 530.

The photonics substrate 530 may additionally include optical components, electrical components, or both. Exemplary components can include layers used to form one or more waveguides for propagating light, cladding layers for confining light, routing layers including metal traces and optical traces, insulating layer for insulating the metal traces, passivation layers, encapsulation layers, planarizing layers, supporting layers, and the like.

In some examples, the substrate 510 can be an interposer. The interposer can provide an electrical interface between the components integrated into the system. Exemplary materials for the substrate 510 can include, but are not limited to, aluminum nitride (AlN), aluminum dioxide ($Al_2O_3$), and silicon.

The substrate 510 can be bonded to a photonics substrate 530, for example. The photonics substrate 530 can include one or more components (e.g., included in a first portion of the photonics substrate 530) such as a light source section 512 and a heater 513. The photonics substrate 530 can also include one or more optical components such as an outcoupler 532. The outcoupler 532 can be configured to focus, collect, collimate, and/or condition (e.g., shape) the light from light source section 512 (and/or another light source section) towards optics (e.g., located between the outcoupler 532 and the window 534) and/or the window 534). Additionally, the photonics substrate 530 can include a support 536. In this manner, the light sources, the photonics integrated circuit, and other components can be co-packaged (e.g., located in the same package).

Additionally, the photonics substrate 530 can include a plurality of sections (e.g., included in a second portion of the photonics substrate 530). The plurality of sections can include multiple materials, where the selected material for each section can be based on one or more targeted criteria. For example, one section can have a targeted criterion of being optically transparent in at least a wavelength range (e.g., visible wavelengths). Another section can have a targeted criterion of providing mechanical support, and another section can have a targeted criterion of being a thermal insulator. For example, a window 534 (e.g., a section having a targeted criterion of being optically transparent) and a thermal isolator 538 (e.g., a section having a targeted criterion of being a thermal insulator) can be formed in the support 536. That is, the support 536 can be a substrate that is single and continuous before the window 534 and the thermal isolator 538 are formed. Openings in the substrate can be formed and filled with one or more materials, which can form the window 534 and the thermal isolator 538 (as discussed below).

In some examples, the window 534 and the thermal isolator 538 can be formed separately from the support 536.

The support 536 can then be located between the window 534 and the thermal isolator 538. In some examples, the support 536 can be adhered (e.g., an adhesive can be located between) to the window 534 and the thermal isolator 538.

The thermal isolator 538 can include one or more materials with lower thermal conductivity than the support 536. For example, the thermal isolator 538 can include amorphous silicon, and the support 536 can include crystalline silicon. The heat conduction paths 517 can form from the heater 513 to the thermal isolator 538, as illustrated in the figure. The heat conduction paths 517 can be correspondingly similar in functionality and/or structure as the heat conduction paths 417. The lower thermal conductivity of thermal isolator 538 can reduce the amount of heat dissipation to the top (e.g., on a side of the photonics substrate 530 that is opposite from the substrate 510) of the photonics substrate 530 (e.g., out to the environment and/or to an external housing of the device). Reducing the amount of heat dissipation to the top of the photonics substrate 530 can increase the heat efficiency (i.e., the change in temperature per power) of the heater 513. With increased heat efficiency, the operation of the heater 513 may lead to lower power consumption.

In some examples, the materials included in the thermal isolator 538 can be the same as the materials included in the window 534 (as discussed below). In this manner, the same material can be used for both the window 534 and the thermal isolator 538, but for exploiting different features. The material for the window 534 can be chosen based on its optical performance, while the material for the thermal isolator 538 can be chosen based on its thermal performance.

As discussed above, the light source can include more than one heater (e.g., the heater 312E, the heater 312F, and the heater 312G illustrated in 3B). The thermal isolator 538 can be located proximate to one heater (e.g., a unique heater such as heater 313E) or may be a continuous material located proximate to multiple heaters (e.g., at least two heaters). In some examples, multiple thermal isolators 538 can be included in the system, where the thermal isolators can be separated by the support 536. In some examples, each thermal isolator 538 can be located proximate to a unique heater. In some examples, the thermal isolator can be the same size as the heater.

In some examples, some of the heaters can be located proximate to one or more thermal isolators, while others of the heaters may not be located proximate to the one or more thermal isolators. For example, the thermal isolators can be located next to those light sources where increased heat efficiency may have more than a de minimus impact on the power consumption of the light source. As another example, the thermal isolators can be excluded from those light sources and associated heaters (e.g., second heaters) where the speed for heating (or cooling) the light source may have more than a de minimus impact on the performance of the light source. For example, some light sources may experience a larger shift in wavelength (i.e., deviation from the targeted wavelength) with change in temperature. Locating a thermal isolator in close proximity to those light sources may cause a delay in tuning the light source back to its targeted wavelength. The system may exclude thermal isolators (or may include a different type of thermal isolator, discussed below) proximate to those light sources and their associated heaters (e.g., second heaters) that experience a larger shift in wavelength than other light sources and their associated heaters (e.g., first heaters) such that the delay in tuning may be reduced.

In some examples, the multiple thermal isolators 538 may include a different type of thermal isolator. The different type of thermal isolator can include, for example, different materials (e.g., a fourth material) having different levels (e.g., lower thermal conductivity than thermal isolator 538) of thermal conductivity. The different materials can include a conductivity that is lower than the material for the support 536. The material for a given thermal isolator 538 can be based on the potential thermal gradient, for example. In some examples, the material for a given thermal isolator can have a thermal conductivity that is lower than the material for the support 536, but higher than the materials for other thermal isolators.

Figure 6:
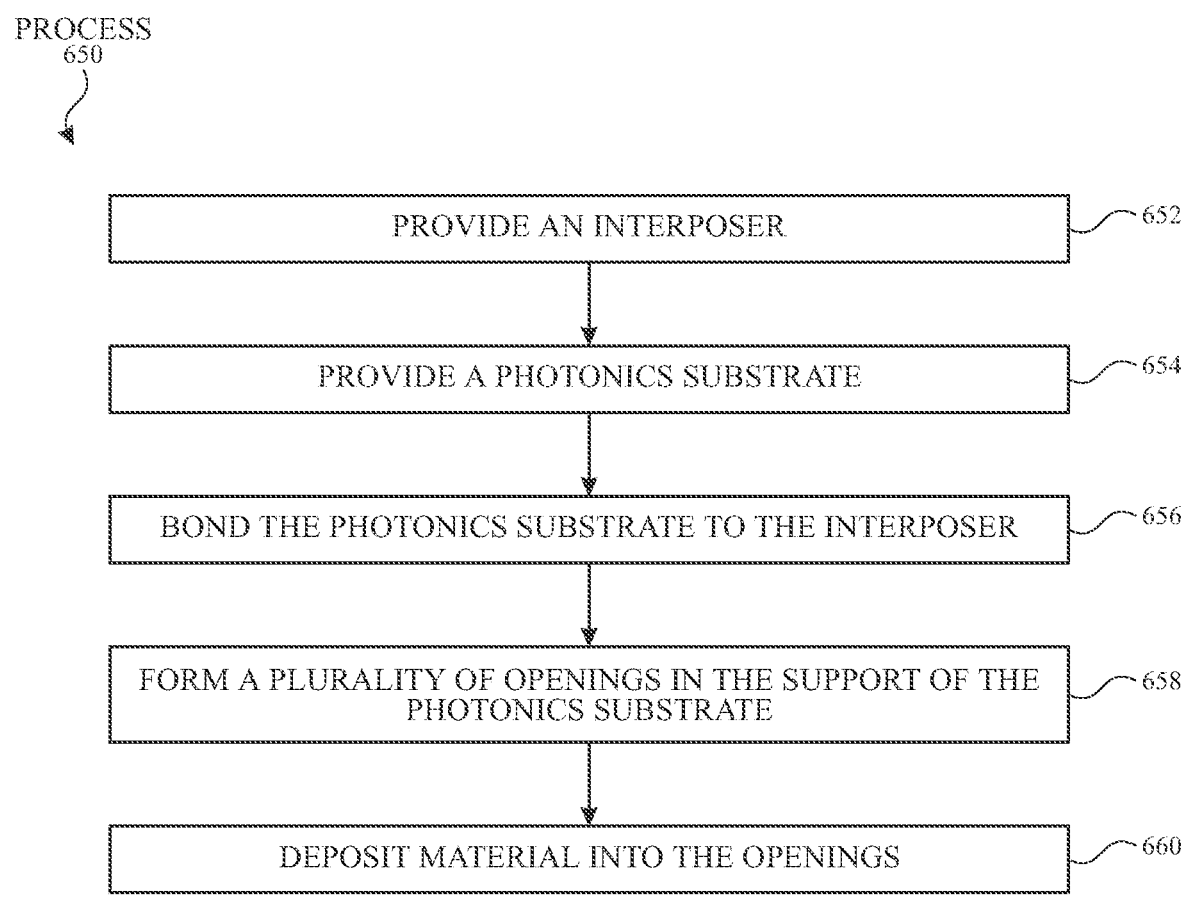
FIG. 6 illustrates an exemplary process for forming a system including one or more thermal isolators according to examples of the disclosure.

FIG. 6 illustrates an exemplary process for forming the system including one or more thermal isolators according to examples of the disclosure. Process 650 can begin with providing a substrate (e.g., substrate 510 illustrated in FIG. 5) such as an interposer (optional) (step 652 of process 650). A photonics substrate (e.g., photonics substrate 530 illustrated in FIG. 5) can be provided (step 654 of process 650). Providing the photonics substrate can include forming one or more outcouplers (e.g., outcoupler 532 illustrated in FIG. 5), forming one or more light sources (e.g., including light source section 512 illustrated in FIG. 5), forming one or more heaters (e.g., heater 513 illustrated in FIG. 5), and/or forming one or more other components (e.g., optical traces). The photonics substrate can be bonded to the interposer (optional) (step 656 of process 650). The photonics substrate can be thinned down, for example. A plurality of openings can be formed in the support (e.g., support 536 illustrated in FIG. 5) of the photonics substrate (step 658 of process 650). At least some of the openings can be for the windows (e.g., window 534 illustrated in FIG. 5), and at least others of the openings can be for the thermal isolator (e.g., thermal isolator 538 illustrate in FIG. 5). In some examples, at least two of the openings can be formed simultaneously. For example, the first openings for the windows and the second openings for the thermal isolators can be formed at the same time.

One or more materials (e.g., amorphous silicon) can be deposited in the openings (step 660 of process 650). Optionally, in the examples where different materials are used for the windows than for the thermal isolator, step 660 can include depositing one type of material in some of the openings, and an additional step can include depositing another type of material in the others of the openings. In some examples, the materials for different openings can be deposited simultaneously. For example, the material for the thermal isolators can be deposited at the same time as the material for the windows.

Figure 7:
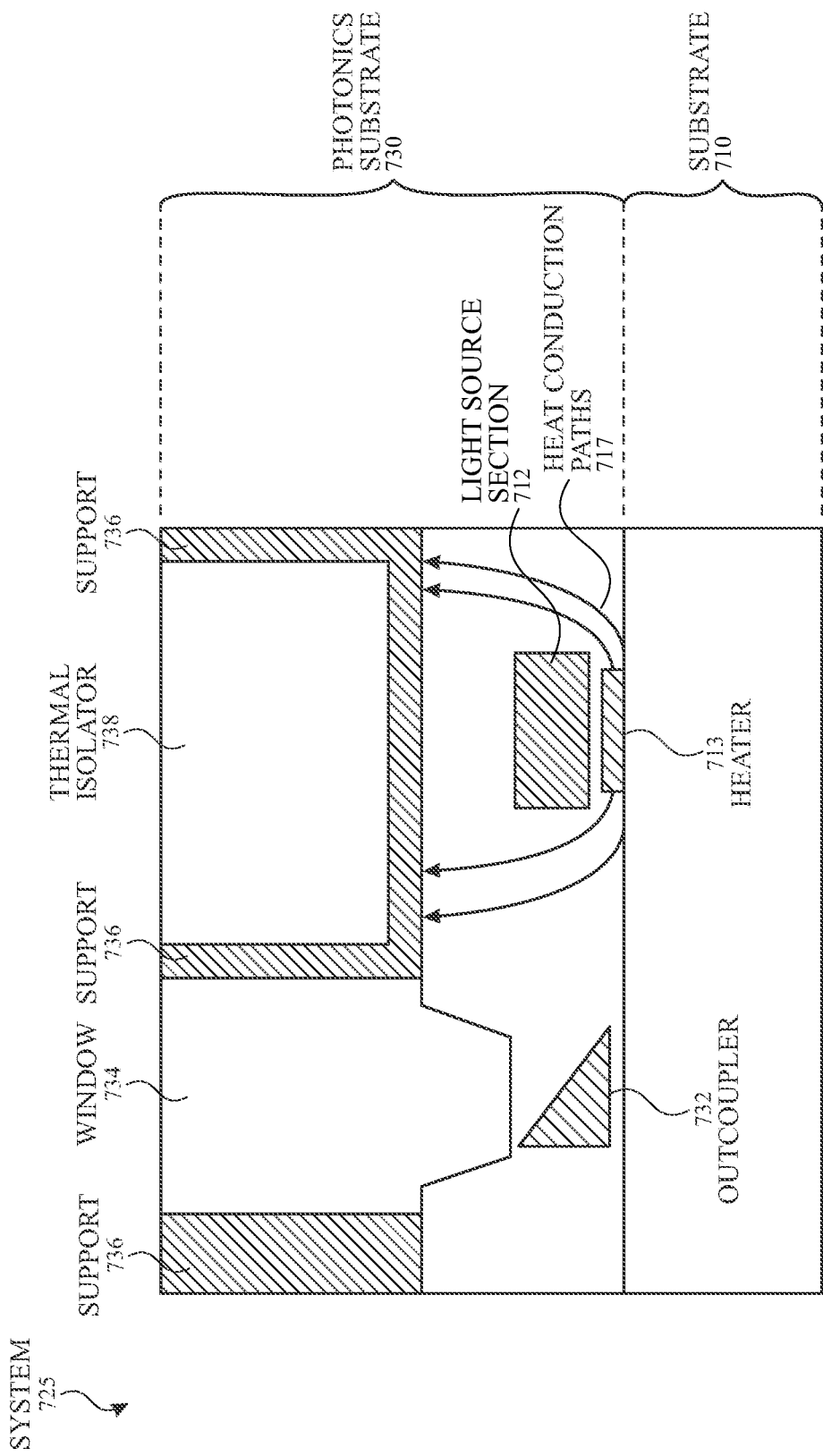
FIG. 7 illustrates a cross-sectional view of an integrated light source system with a partially etched support for thermal isolation according to examples of the disclosure.

In some examples, the process can include different etch depths for forming the plurality of openings. For example, the opening for the window may be etched more (i.e., closer to the substrate 710) than the opening for the thermal isolator, as illustrated in FIG. 7. That is, the first etch depth for the first openings for the window may be greater than the second etch depth for the second openings for the thermal isolator. The system 725, the photonics substrate 730, the substrate 710, the window 734, the outcoupler 732, the heater 713, the heat conduction paths 717, the light source section 712, and the support 736 can include one or more correspondingly similar components and/or functions as the components discussed in the context of FIGS. 4 and 5. Additionally, the support 736 can include one or more sections located between the thermal isolator 738 and the light source section 712. That is, the support 736 can be located around multiple (e.g., at least three) sides of the thermal isolator 738. In this manner, enhanced support may be provided.

A system is disclosed. The system can comprise: a substrate including: a first portion including: one or more optical components including one or more light source sections, and one or more first heaters proximate to the one or more light source sections; and a second portion including one or more first sections, one or more second sections, and one or more third sections, the one or more first sections including a first material, wherein the first material is optically transparent in at least a wavelength range, the one or more second sections including a second material, wherein the second material is configured for supporting the second portion, and the one or more third sections including a third material, wherein the third material has a lower thermal conductivity than the second material, wherein the one or more third sections are located proximate to the one or more first heaters and the one or more light source sections. Additionally or alternatively, in some examples, the one or more first sections are windows. Additionally or alternatively, in some examples, the first material includes amorphous silicon. Additionally or alternatively, in some examples, the second material includes crystalline silicon. Additionally or alternatively, in some examples, the third material includes amorphous silicon. Additionally or alternatively, in some examples, the first material and the third material are the same material. Additionally or alternatively, in some examples, the third material has a lower thermal conductivity than the first material. Additionally or alternatively, in some examples, each third section is located proximate to a unique first heater. Additionally or alternatively, in some examples, at least one third section is located proximate to at least two of the one or more first heaters. Additionally or alternatively, in some examples, the system further comprises: one or more second heaters included in the first portion, wherein the one or more third sections are not located proximate to the one or more second heaters. Additionally or alternatively, in some examples, the one or more second heaters are associated with one or more light sources having a lower shift in wavelength with change in temperature than one or more light sources associated with the one or more first heaters. Additionally or alternatively, in some examples, the second portion of the first substrate further includes: one or more fourth sections including a fourth material, wherein the fourth material has a lower thermal conductivity than the second material, and wherein the third material has a lower thermal conductivity than the fourth material. Additionally or alternatively, in some examples, at least one of the one or more second sections is located around three or more sides of at least one of the one or more third sections. Additionally or alternatively, in some examples, the system further comprises: an interposer bonded to the substrate.

A method for forming a system is disclosed. The method can comprise: providing a substrate, the substrate including a first material; forming a plurality of first openings for windows in the substrate; forming a plurality of second openings for thermal isolators in the substrate; depositing a second material in the plurality of first openings, wherein the second material is optically transparent; depositing a third material in the plurality of second openings, wherein the third material has a lower thermal conductivity than the first material; and locating the plurality of second openings proximate to one or more light source sections and one or more heaters. Additionally or alternatively, in some examples, forming the plurality of first openings and forming the plurality of second openings occur simultaneously. Additionally or alternatively, in some examples, depositing the second material and the third material occur simultaneously. Additionally or alternatively, in some examples, the second material and the third material are the same material. Additionally or alternatively, in some examples, forming the plurality of first openings includes etching to a first depth, wherein forming the plurality of second openings include etching to a second depth, wherein the first depth is deeper than the second depth. Additionally or alternatively, in some examples, the method further comprises: bonding the substrate to an interposer.

Although examples have been fully described with reference to the accompanying drawings, it is to be noted that various changes and modifications will become apparent to those skilled in the art. Such changes and modifications are to be understood as being included within the scope of the various examples as defined by the appended claims.

The invention claimed is:
1. A system comprising:
a first portion including:
one or more optical components including one or more light source sections, and
one or more first heaters proximate to the one or more light source sections; and
a second portion including one or more first sections, one or more second sections, and one or more third sections,
the one or more first sections including a first material, wherein the first material comprises amorphous silicon and is optically transparent in at least a wavelength range, the one or more second sections including a second material, wherein the second material provides mechanical support to the second portion, and the one or more third sections including a third material, wherein the third material has a lower thermal conductivity than the second material,
wherein the one or more third sections of the second portion are located proximate to the one or more first heaters and the one or more light source sections of the first portion.
2. The system of claim 1, wherein the one or more first sections are windows.
3. The system of claim 1, wherein the second material includes crystalline silicon.
4. The system of claim 1, wherein the third material includes amorphous silicon.
5. The system of claim 1, wherein the first material and the third material are the same material.
6. The system of claim 1, wherein the third material has a lower thermal conductivity than the first material.
7. The system of claim 1, wherein each third section is located proximate to a unique first heater.
8. The system of claim 1, wherein at least one third section is located proximate to at least two of the one or more first heaters.
9. The system of claim 1, further comprising:
one or more second heaters included in the first portion, wherein the one or more third sections are not located proximate to the one or more second heaters.
10. The system of claim 9, wherein the one or more second heaters are associated with one or more light sources having a lower shift in wavelength with change in temperature than one or more light sources associated with the one or more first heaters.

11. The system of claim 1, wherein the second portion further includes:
one or more fourth sections including a fourth material, wherein the fourth material has a lower thermal conductivity than the second material, and
wherein the third material has a lower thermal conductivity than the fourth material.

12. The system of claim 1, wherein:
at least one of the one or more second sections is located around three or more sides of at least one of the one or more third sections.

13. The system of claim 1, wherein the first portion and the second portion are included in a substrate, the system further comprising:
an interposer bonded to the substrate.

14. A method for forming a system, the method comprising:
providing a substrate, the substrate including a first material;
forming a plurality of first openings for windows in the substrate;
forming a plurality of second openings for thermal isolators in the substrate;
depositing a second material in the plurality of first openings, wherein the second material is optically transparent;
depositing a third material in the plurality of second openings, wherein the third material has a lower thermal conductivity than the first material; and
locating the plurality of second openings proximate to one or more light source sections and one or more heaters.

15. The method of claim 14, wherein forming the plurality of first openings and forming the plurality of second openings occur simultaneously.

16. The method of claim 14, wherein depositing the second material and the third material occur simultaneously.

17. The method of claim 14, wherein the second material and the third material are the same material.

18. The method of claim 14, wherein forming the plurality of first openings includes etching to a first depth, wherein forming the plurality of second openings includes etching to a second depth, wherein the first depth is greater than the second depth.

19. The method of claim 14, further comprising:
bonding the substrate to an interposer.

* * * * *